United States Patent

[11] 3,607,844

| | | |
|---|---|---|
| [72] | Inventor | Ray D. Taylor<br>Brecksville, Ohio |
| [21] | Appl. No. | 862,968 |
| [22] | Filed | Oct. 1, 1969 |
| [45] | Patented | Sept. 21, 1971 |
| [73] | Assignee | The B. F. Goodrich Company<br>New York, N.Y. |

[54] PROCESS FOR THE PREPARATION OF POLY(TRITHIOCARBONATE)
8 Claims, No Drawings

[52] U.S. Cl................................................. 260/79,
260/29.2 R, 260/79.1, 260/608, 260/793
[51] Int. Cl.......................................................C08g 23/00
[50] Field of Search............................................. 260/79,
29.2, 79.1, 608

[56] References Cited
UNITED STATES PATENTS
3,400,104  9/1968  Liggett........................ 260/79

Primary Examiner—Donald E. Czaja
Assistant Examiner—M. I. Marquis
Attorneys—J. Hughes Powell, Jr. and Ernest K. Bean

ABSTRACT: Poly(trithiocarbonate) is prepared by the reaction of alkali or alkaline earth metal trithiocarbonate and halogen at a controlled pH in an aqueous reaction medium. The process gives high purity and high molecular weight poly(trithiocarbonate) in yields as high as 90 percent.

PROCESS FOR THE PREPARATION OF POLY(TRITHIOCARBONATE)

BACKGROUND OF THE INVENTION

Polymeric compounds containing high proportions of sulfur and having the general formula $(CS_{2+x})_n$ wherein $x$ can range from about 0 to 3 have been reported in the literature. There has been, however, no completely acceptable process for preparing these materials. Processes heretofore known have given poor yields in addition to producing poor quality materials of low molecular weight.

The preparation of poly (trithiocarbonate) described by D. Krebs et al., Z. Anorg. Afflg. Chem., 338, 225 (1965) by the reaction of equimolar amounts of SC(SH)$_2$ and bromine in chloroform, gave about 20 percent yield and the poly(trithiocarbonate) had a low molecular weight.

It is highly advantageous to obtain high molecular weight poly(trithiocarbonate) in good yield both from an economic standpoint and the point of view of having a product containing a larger proportion of $-(CS_3)-$ units and therefore fewer terminating end groups. This latter feature is very significant in reactions employing the poly(trithiocarbonate) since the terminal groups, which are most often halogen groups, can function as an impurity and interfere with the reaction, that is, alter the rate of reaction or result in less pure product being obtained.

SUMMARY OF THE INVENTION

I have now discovered a process for the preparation of poly(trithiocarbonate) in an aqueous media. The process consists of reacting essentially equimolar amounts of an alkali or alkaline earth metal trithiocarbonate with halogen at a controlled pH. The aqueous reaction medium preferably contains a surfactant and has a pH of about 10 or greater. Control of the pH is achieved by the addition of a basic compound such as alkali or alkaline earth metal hydroxides or quaternary ammonium hydroxides. The process is conducted at a temperature between about −15° C. and 40° C.

DETAILED DESCRIPTION

The present process for the production of poly (trithiocarbonate) consists of reacting a trithiocarbonate compound and a halogen at a controlled pH in an aqueous media. The trithiocarbonate compound will be an alkali metal trithiocarbonate, such as sodium trithiocarbonate or potassium trithiocarbonate, or an alkaline earth metal trithiocarbonate such as calcium trithiocarbonate or barium trithiocarbonate. Trithiocarbonic acid may also be used for the present process. It is not necessary for this process that the trithiocarbonate compound employed be in a highly pure state. Small amounts of impurities may be present with little or no effect on the reaction. The trithiocarbonate compounds may contain water of hydration and, in some instances, need not be isolated or purified prior to the reaction forming the poly(trithiocarbonate). As a result, the trithiocarbonate can therefore be prepared in situ by a variety of reactions, especially those in which an aqueous reaction medium is employed. In the latter instance it is only necessary to add the halogen and adjust the pH of the reaction mixture to conduct the reaction.

The trithiocarbonate-containing compound is reacted with a halogen, preferably chlorine or bromine. The trithiocarbonate compound and the halogen will be present in essentially equimolar proportions. In these proportions high molecular weight poly(trithiocarbonate) is obtained. A molar excess, up to about 25 percent, of either reactant can be employed, however, and still obtain acceptable results. The halogen may be added to the reaction mixture either incrementally or entirely at the outset of the reaction. It is generally most advantageous to proportion the halogen into the reaction mixture over a period of time so as to achieve a more uniform reaction. Reaction temperature and rate of reaction are more easily controlled in this manner. The halogen may be passed directly into the aqueous reaction mixture or it is sufficient to charge it over the surface of the reaction mixture.

The trithiocarbonate compound and halogen are reacted in an aqueous reaction medium at a pH of about 10 or greater and at a temperature of about −15° C. to about 40° C. Under these conditions, improved yields are obtained, the reaction is easily controllable and high molecular weight poly(trithiocarbonate) is obtained. The aqueous reaction medium will generally be present in an amount from about 0.5 to about 15 parts by weight per weight part trithiocarbonate compound.

Basic compounds are employed in the present process to adjust the pH of the reaction mixture. A pH of about 10 or more is maintained. The basic compound can be an alkali metal hydroxide such as sodium hydroxide or potassium hydroxide, an alkaline earth metal hydroxide such as barium hydroxide or calcium hydroxide or a quaternary ammonium hydroxide such as benzyltrimethyl ammonium hydroxide, tetramethyl ammonium hydroxide or the like. The amount of the base compound employed will be governed by the particular base compound used and the pH desired. Large excess of base may be employed if desired, so that the pH will be greater than 10, with little or no effect on the reaction. When sodium hydroxide or potassium hydroxide are employed, they are normally added to the reaction mixture as an aqueous solution. The base may be added entirely at the outset of the reaction or may be added incrementally or proportioned into the reactor throughout the reaction. This latter procedure is particularly advantageous since the reaction temperature is more easily controlled with this manner of addition and better yields of the poly(trithiocarbonate) are thus obtained.

If a surface-active agent is employed, any conventional surfactant may be used. Excellent results have been obtained when the surfactant is a fatty acid containing from about eight to 24 carbon atoms such as octanoic acid, decanoic acid, stearic acid and the like. In general, however, the surfactant need not be limited to these fatty acid materials but can be any material suitable for this purpose. Other useful surfactants will include anionic, cationic and nonionic compounds such as sodium lauryl sulfate, sorbitan monolaurate, alkali metal salts of sulfonated petroleum or paraffin oils, sodium salts of aromatic sulfonic acids such as dodecane-1-sulfonic acid and octadiene-1-sulfonic acid, aralkyl sulfonates such as sodium isopropyl benzene sulfonate and sodium isobutyl naphthalene sulfonate, alkali metal sulfonated dicarboxylic acid esters such as sodium dioctyl sulfosuccinate and disodium-N-octadecyl sulfosuccinamate, trimethyl cetyl ammonium bromide, dodecyl trimethyl ammonium bromide, di-cocoa-dimethyl ammonium chloride, benzyl trimethyl ammonium hydroxide, octylor nonylphenyl polyethoxyethanol, alkylphenoxy polyoxyethylene ethanols or the like.

The amount of surfactant employed will be varied, depending on the particular reaction conditions employed, however, it will typically range up to about 10 or more grams per mol of the trithiocarbonate. Excellent results are obtained when about 0.5 to about 5 grams surfactant per mol trithiocarbonate is employed. The surfactant can be metered into the reaction mixture throughout the run, however, it is generally most desirable that the surfactant be charged entirely at the outset of the reaction.

When the reaction is conducted in accordance with the above teachings, excellent yields of poly(trithiocarbonate), much improved over reactions previously known, are obtained. Yields of 90 percent or higher are obtained with the present process. The resulting poly(trithiocarbonates) are obtained in a relatively pure state and have high molecular weights. The molecular weight of poly(trithiocarbonate) obtained by the present process will be as high as 1,000 or greater and can range as high as 5,000. The poly(trithiocarbonate) is recovered as an orange to orange-yellow amorphous solid having a softening point of about 120° C.

To more clearly illustrate the present invention, to a 3-liter resin kettle fitted with a condenser, thermometer, gas inlet tube and high speed stirrer were introduced 1,200 grams of aqueous sodium sulfide solution containing 2 mols sodium sulfide, 152 grams carbon disulfide, 10 grams sodium hydroxide in 100 ml. H$_2$O and 5 grams decanoic acid. The reaction mixture was allowed to react for about 48 hours at room temperature. The reactor and its contents were then cooled to about 15° C. and about 100 grams of a solution of 80 grams sodium hydroxide in 320 ml. water added. Chlorine was then charged to the reactor at a slow rate. The remainder of the sodium hydroxide solution was added in three increments over a 2-hour period while maintaining the chlorine flow. Two mols (total) chlorine were metered into the reactor. The reaction temperature was maintained at about 15° C. throughout the various additions. At the completion of the reaction, the reaction mixture was filtered, washed twice with water and once with ethanol, air dried and ground in a ball mill. The resulting poly(trithiocarbonate) after further drying had a melt point of 120° C. and an estimated molecular weight of about 1,000. About 80 percent yield of the yellow-orange amorphous polymer was obtained. Similar results were obtained when sorbitan monolaurate and benzyl trimethyl ammonium hydroxide were employed at 5° C. for the reaction of potassium trithiocarbonate and chlorine.

The poly(trithiocarbonate) is a useful and convenient source of carbon disulfide and can be used in any application where the controlled liberation of carbon disulfide is desired. One such application is in the vulcanization of rubber such as described in U.S. Pat. No. 1,774,322. For example, when the poly(trithiocarbonate) and a secondary amine derivative such as piperidine-formaldehyde are incorporated into a rubber composition containing zinc oxide and sulfur, an increased rate of vulcanization is observed when compared to the same rubber composition without the poly(trithiocarbonate) and amine. Such rubber compositions may be readily handled and processed at temperatures below the vulcanization temperature or stored for prolonged periods without any appreciable curing.

I claim:

1. A process for the preparation of poly(trithiocarbonate) comprising reacting a trithiocarbonate compound selected from the group consisting of alkali metal trithiocarbonate or alkaline earth metal trithiocarbonate and a halogen in an aqueous reaction medium at a pH greater than about 10.

2. The process of claim 1 wherein the trithiocarbonate compound and halogen are present in essentially equimolar proportions and is conducted between about −15° C. and about 40° C.

3. The process of claim 2 wherein the trithiocarbonate compound is sodium trithiocarbonate and the halogen is chlorine.

4. The process of claim 1 wherein the aqueous reaction medium contains a surfactant selected from the group consisting of fatty acids containing from eight to 24 carbon atoms, sodium lauryl sulfate, sorbitan monolaurate, alkali metal salts of sulfonated petroleum or paraffin oils, sodium salts of aromatic sulfonic acids, aralkyl sulfonates, alkali metal sulfonated dicarboxylic acid esters, trimethyl cetyl ammonium bromide, dodecyl trimethyl ammonium bromide, di-cocoa-dimethyl ammonium chloride, benzyl trimethyl ammonium hydroxide, octyl- and nonylphenyl polyethoxyethanol and alkylphenoxy polyoxyethylene ethanols and is conducted between about −15° C. and about 40° C.

5. The process of claim 4 wherein the trithiocarbonate compound and halogen are present in essentially equimolar proportions with up to about 10 grams surfactant per mol of the trithiocarbonate compound.

6. The process of claim 5 wherein the trithiocarbonate compound is sodium trithiocarbonate and the halogen is chlorine with about 0.5 to 5 grams fatty acid surfactant containing from eight to 24 carbon atoms per mol of sodium trithiocarbonate. earth metal hydroxide or quaternary ammonium hydroxide.

7. The process of claim 6 wherein the pH is controlled by the addition of an alkali metal hydroxide, alkaline earth metal hydroxide or quaternary ammonium hydroxide.

8. The process of claim 6 wherein the sodium trithiocarbonate is prepared in situ in an aqueous medium.

PO-1050
(5/69)

UNITED STATES PATENT OFFICE
CERTIFICATE OF CORRECTION

Patent No. 3,607,844        Dated September 21, 1971

Inventor(s)  Ray D. Taylor

It is certified that error appears in the above-identified patent and that said Letters Patent are hereby corrected as shown below:

Column 4, Claim 6, line 31, delete "earth metal hydroxide or quaternary ammonium hydroxide".

Signed and sealed this 14th day of March 1972.

(SEAL)
Attest:

EDWARD M. FLETCHER, JR.
Attesting Officer

ROBERT GOTTSCHALK
Commissioner of Patents